United States Patent Office 3,514,071
Patented May 26, 1970

3,514,071
SHOCK PULSE GENERATOR
Elbert Marston Moffatt, Glastonbury, Conn., assignor to United Aircraft Corporation, East Hartford, Conn., a corporation of Delaware
Filed Apr. 14, 1967, Ser. No. 631,009
Int. Cl. F15b 15/22
U.S. Cl. 251—31   11 Claims

ABSTRACT OF THE DISCLOSURE

This disclosure relates to an instrument which produces high strength pressure pulses in a shock tube without using frangible diaphragms. A pulse is developed from a pressure surge generated in the shock tube by rapidly opening or closing a valve between the shock tube and a fluid reservoir. The rapid opening or closing of the valve is achieved by means of a fluid actuator which develops a high velocity motion in the output member.

BACKGROUND OF THE INVENTION

This invention relates to an instrument which generates shock pulses in a fluid medium, and which is especially suited to producing shock waves in a gas.

Shock pulses have been artificially created in gases by bursting a frangible diaphragm and suddenly releasing a large charge of high pressure gas into an environment at a lower pressure. Such an apparatus requires that the frangible diaphragm be replaced each time a shock pulse is generated. Continuous production of shock pulses requires a new diaphragm for each pulse produced and the repetition rate is very slow in comparison to the rate of temperature and pressure perturbations possible in a gas. Spark sources have been used to produce a much higher pulse rate in gaseous mediums but they cannot be used in combustible gases for safety reasons.

In some situations it is desirable to be able to continuously produce shock pulses in a combustible environment at a much higher rate than the diaphragm system allows. For instance, the rate of gas flow in a pipeline can be measured by periodically sending shock pulses up and downstream in the flow and measuring the difference in time that the shock pulses take to traverse a fixed distance in each direction. A suitable transducer for detecting the shock pulses generated by the source is disclosed in my copending U.S. application Ser. No. 606,275, filed Dec. 30, 1966.

As disclosed in U.S. Pat. No. 3,182,745, pulse transducers with oscillating valves have been developed for continuously producing pulses in liquid. Because of the relatively high density and incompressibility of liquids, however, pressure pulses in liquids are created rather easily. The well-known "knock" when a water pipe is shut off is one common example. A more difficult problem arises when a shock pulse is generated in a gas. The tendency for a gas to compress requires, first of all, that a large quantity of gas be pushed together before a high energy pressure pulse is formed. Secondly, opposing the build-up of pressure is the low inertia and compressibility of the adjacent mass of gas against which the large compressed mass must be developed. Moving a large quantity of gas through a valve in a pressure front requires that the orificing effect of valve openings be minimized and that the valve be actuated between fully closed and fully opened positions before the pressure front disperses.

Even rapid actuation of the valve and large valve openings will not immediately generate a pulse having a sharp front suitable for timing purposes. Such a shock pulse is not generated until the pulse has begun to move through a shock tube. In the shock tube, the compressed gas behind the pressure front catches up to and reinforces the leading edge of the pulse, to create a shock front with a steep leading edge. Such shock fronts are necessary in gas flow measuring systems in order to obtain a strong signal indicating a well-defined arrival time of the pulse.

SUMMARY OF THE INVENTION

It is a primary object of this invention to present an apparatus which can continuously produce shock pulses in a gas without using a frangible diaphragm or spark source.

In accordance with this primary object, the pulse generator incorporates a rapid acting valve interposed between a shock tube and a reservoir. When the valve is in the open position, flow is established through an annular port at a closed end of the shock tube in response to the pressure differential between fluid within the shock tube and fluid within the reservoir. With this tube-valve-reservoir combination, a shock pulse can be generated by rapidly opening the valve and permitting a surge of high pressure gas to enter the shock tube from a high pressure reservoir. A shock pulse is also generated in the shock tube by establishing flow from the shock tube through the port to a low pressure reservoir and suddenly closing the valve.

Since valve actuation between opened and closed positions must be rapid, and since a large flow of gas is necessary to produce a strong shock pulse, the port in the shock tube is formed by a peripheral slot which exposes an annular passage leading to the inside of the tube. The peripheral slot provides a large cross-sectional area for gas flow and can be fully exposed with a small amount of valve motion.

Rapid actuation of the valve is provided by a fluid actuator which accelerates an output member to a high velocity before flow conditions through the port are changed. The actuator, including a piston and cylinder, can be triggered manually through a solenoid valve which permits a charge of pressurized fluid to operate against the piston. The piston and cylinder are specially shaped to form two effective piston pressure areas, one of the areas being inoperative until a large pressure differential is available across the piston. Once a charge of fluid has actuated the piston, the piston is returned by fluid pressure or a mechanical spring to its original position in preparation for the next cycle of operation. Buffer chambers are formed by the piston and cylinder at each end of the piston stroke to preserve the structural integrity of the actuator.

One particular aspect of the invention includes the generator in a gas pipeline installation. The instrument derives power from the pipeline and minimizes the quantity of gas discharged to atmosphere during the cycle of operation.

BRIEF DESCRIPTION OF THE DRAWINGS

FIG. 3 is an alternate embodiment of the generator in a pipeline installation.

DESCRIPTION OF THE PREFERRED EMBODIMENTS

Figure 1:
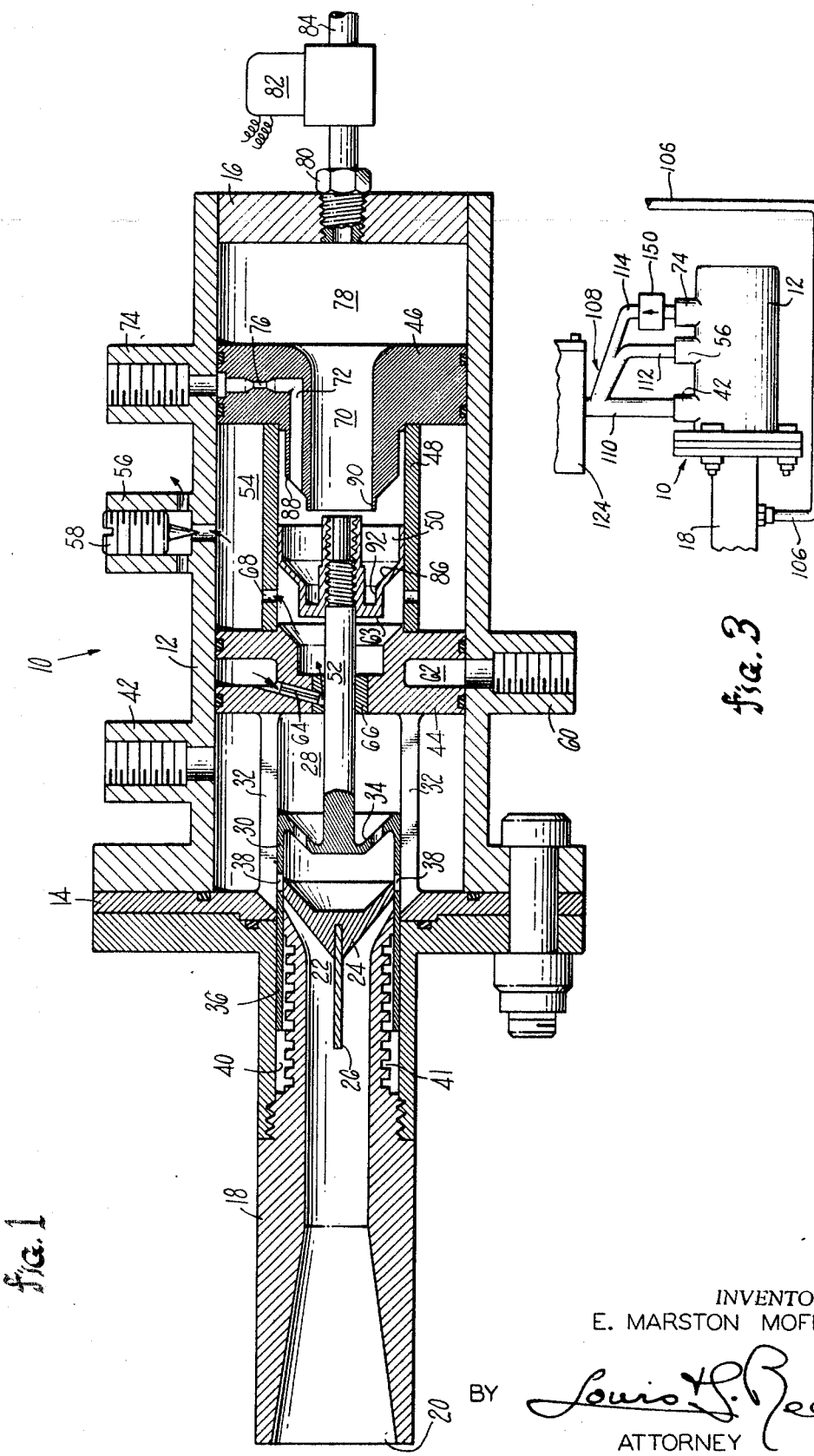
FIG. 1 is a cutaway view of the shock pulse generator showing the shock tube, valve, and actuator.

With reference to FIG. 1, the essential parts of the shock wave generator will be seen in section. The generator, designated by numeral 10, has a housing composed of cylinder 12, and end plates 14 and 16.

Attached to end plate 14 is a shock tube 18 having a shock wave exit 20. At the opposite end 22 of shock tube 18 is a tapered plug 24 which projects into the end 22 of the tube 18. The inner walls of the shock tube at the end 22 flare outwardly so that the tapered plug 24 and the walls form an annular passage leading into the tube from a circumferential slot at the periphery of the tube. The plug 24 is supported coaxially within the end 22 of the shock tube 18 by bracket 26. Although the plug 24 and shock tube 18 are shown as separate members, the two could be constructed from a single piece of material with the plug 24 being supported by small web sections equally spaced along the circumferential slot.

The tube 18 projects through the end plate 14 into a chamber 28 formed by the cylinder 12 and end plate 14. Within this chamber is a slide valve 30 which moves back and forth on guides 32. The guides 32 are spaced from one another so that the chamber 28 occupies essentially the whole end of cylinder 12 adjacent to end plate 14 with the exception of that volume occupied by the valve 30 and guides 32. The slide valve 30 is composed of a cup-shaped member having a perforated base 34 and an extended skirt section 36. The base 34 is perforated to prevent the gas between the base 34 and plug 24 from being compressed and consequently restricting movement of the valve 30. The inside diameter of the skirt section 36 is approximately the same size as the outside diameter of the end 22 of the shock tube 18 and the plug 24. The skirt section 36 envelops both end 22 and plug 24 and slides in a reciprocating manner back and forth over the slot. The valve 30 has a number of apertures 38 equally spaced around a circumference of the skirt section 36. These apertures 38 will move back and forth across the slot to open and close the passage between the inside of the tube 18 and the chamber 28. The well 40, into which the skirt section 36 moves, is deep enough to permit the apertures 38 to move entirely across the slot and the width of the apertures 38 parallel to the stroke of the slide valve is larger than the corresponding width of the slot. This means that as the slide valve 30 moves across the slot, the apertures 38 will open the passage into the shock tube, hold the passage open for a period of time, and then close the passage as the skirt section moves into the well 40. The peripheral slot provides for a large cross-sectional area for gas flow during the time the valve is open and the valve moves between the fully closed and the fully opened positions within a small segment of the displacement of the valve.

The grooves 41 in the well 40 are filled with a lubricating grease to allow the valve 30 to slide easily and gas displaced from the well 40 by the skirt section 36 is expelled between the loose-fitting end plate 14 and skirt section 36.

It will be understood that when the apertures 38 register with the slot between the tube 18 and plug 24 that free flow of gas between the chamber 28 and shock tube 18 is permitted. The direction of flow between the shock tube and chamber 28 will depend upon the pressure differential between the gas source connected to fitting 42 and the gas to which exit 20 of the shock tube 18 is exposed. If the pressure of the source is higher than the pressure in the shock tube, flow will be from the chamber 28 through the annular passage into the shock tube 18. If the pressure in the shock tube is higher than the pressure of the source, flow will be from the shock tube 18 to the chamber 28.

The chamber 28 is bounded at its right-hand end by a partition 44. The partition 44 and the cylinder head 46 close the ends of a cylinder 48. Within the cylinder 48 is a piston 50 which has a piston rod 52 connected through the partition 44 to the valve 30. As the piston reciprocates in the cylinder 48 between the partition 44 and cylinder head 46, the piston rod 52 moves the slide valve 30 between the opened and closed positions. The cylinder 48 is concentrically mounted within the cylinder 12 and forms an annular chamber 54 within the cylinder 12. Chamber 54 is vented through an adjustable bleed fitting 56. The bleed fitting 56 has an adjusting screw 58 for controlling the flow of fluid in and out of chamber 54.

A pressure fitting 60 furnishes a continuous supply of pressurized fluid into an annular chamber 62 within the partition 44. As indicated by the arrows, the annular chamber 62 applies the pressurized fluid against the surface 63 of the piston 50 through an orificed supply channel 64 and the piston rod seal 66. This same fluid is bled from the cylinder chamber through vent ports 68 into the chamber 54. The size of the orifice in channel 64 and the adjustment of screw 58 will normally establish the steady state pressure applied to the surface 63 of the piston 50.

When the piston 50 moves toward partition 44, it closes vent ports 68 and establishes a buffing chamber with the cylinder 48 and partition 44. This buffing chamber prevents the piston 50 from impacting against the partition 44 when the piston moves toward the partition 44 at a high speed.

The opposite end of the cylinder 48 is closed by the cylinder head 46. The head 46 has a central charging channel 70 which leads into the cylinder chamber formed between the piston 50 and cylinder head 46. Also included in the head 46 is an orificed channel 72. This channel leads to a fitting 74 through an orifice 76. A charging chamber 78 is formed by the cylinder head 46, end plate 16 and the intermediate portion of the cylindrical housing 12. A fitting 80 is used to supply the charging chamber 78 with fluid from a pressurized source. An electrically controlled solenoid 82 opens and closes the line 84 leading from the pressurized source to the fitting 80.

It will be noted that the piston 50 and the cylinder head 46 have similar contoured surfaces 86 and 88. The contoured surfaces 86 and 88 are mated to permit the piston 50 to move in intermeshing relationship with the head 46 during a segment of the stroke adjacent to head 46. In particular, a small cylindrical projection 90 on the head 46 fits within a matching annular recess 92 in the piston 50. The overlapping surfaces of the projection 90 and recess 92 will move in sliding contact as the piston 50 moves over the projection 90.

When the piston 50 has moved over projection 90, only the central piston pressure area bounded by the surface of recess 92 in sliding contact with projection 90 will be exposed to the pressurized fluid in the charging chamber 78. The other portion of the piston pressure area circumscribing the recess 92 will be exposed to the pressure to which channel 72 vents. Any leakage from the chamber 78 to the channel 72 will experience a drop in pressure across the orifice formed between the surfaces of the projection 90 and recess 92 in sliding contact. The orifice formed between these surfaces is therefore much smaller than the orifice 76 in channel 72. As the piston 50 moves out of sliding contact with the projection 90, both the central pressure area of the piston and the outer pressure area of the piston will be exposed to the pressure of the charging channel 70. With the increase in the effective piston pressure area, as the projection 90 and recess 92 move out of engagement, the piston will experience a sudden increase in the force accelerating it toward the partition 44. The charge of fluid working against the piston will tend to bleed through channel 72 but the orifice 76 will prevent any significant loss of pressure until the piston has reached a high velocity at the opposite end of the cylinder.

It will be recognized that overlapping surfaces are not essential to a piston and cylinder assembly which forms the two effective piston pressure areas as described. For instance, the recess 92 could be filled in and the projection 90 could be substantially foreshortened to simply form a seat against which the piston could move. With such a design, however, and without seals, a very large leakage rate may exist between the charging channel 70 and the orificed channel 72. In the disclosed embodiment, the overlapping surfaces of the projection 90 and recess 92 form a small orifice which permits the orificing channel 72 to expose the outer piston pressure area to a low pressure until a substantial pressure differential exists between the charging chamber pressure and the pressure on the opposite side of the piston. This insures that a large pressure differential, determined by the ratio of the central piston pressure area of surface 86 and the effective piston pressure area of surface 63, will exist to suddenly accelerate the piston toward the partition 44 when the equilibrium condition is slightly unbalanced.

The projection 90 also forms a small buffing chamber between the projection 90, the cylinder 48, the piston 50 and the head 46 on the return stroke of the piston 50. As the piston moves back into intermeshing relationship with the cylinder head 46, the fluid in this small buffing chamber will be forced into the orifice channel 72, but if the piston 50 is moving rapidly, the orifice 76 will cause the pressure in this buffing chamber to build up. The pressure reached in the small buffing chamber will be much higher than a pressure which would be developed if the large volume of fluid in the charging chamber 78 were also connected to the buffing chamber.

The partition 44 and the piston 50 are also shaped with respective projections and recesses which move into engagement. When the piston 50 is adjacent to the partition 44, the skirt of the piston covers the vent ports 68 to form a buffing chamber between the piston 50 and partition 44. The mating elements of the piston 50 and partition 44 permit the volume of this buffing chamber to be utilized to the greatest advantage. The piston attempts to displace all of the fluid in the chamber and therefore builds up a high decelerating pressure without impacting against the partition 44. The shape of the central portion of the piston is dictated primarily by the projection 90 and recess 92 configuration. The frustoconical section of the piston 50 is for light-weight strength and is also used in the construction of valve 30. Light weight is desired to improve the acceleration rate of the piston 50 when the pressure of the charging chamber is fixed.

The location of the vent ports 68 in cylinder 48 is selected according to the connection between the piston and valve. The piston does not close the vent ports 68 until the apertures 38 of the valve 30 have moved into registry with the slot formed by the plug 24 and the shock tube 18. This means that there will be no buffing chamber action to slow the piston 50 until after the apertures 38 have begun to cut off flow through the annular passageway in the shock tube 18. This positioning of the vent ports 68 will not, therefore, deter rapid actuation of the valve between the opened and closed positions. A limited freedom in positioning the ports 68 is permitted since a high decelerating force is not developed until the fluid in the buffing chamber has been substantially compressed.

Figure 2:
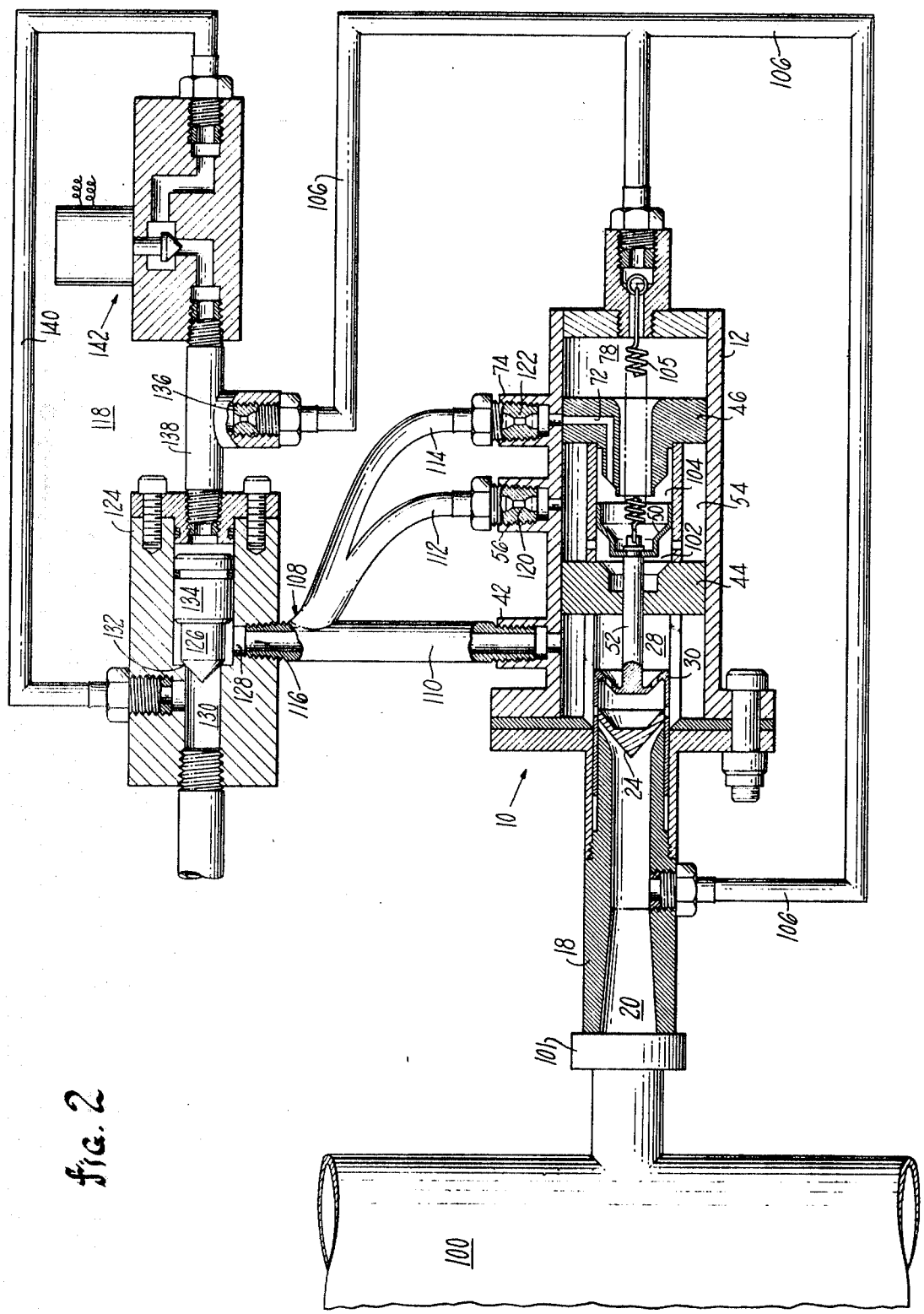
FIG. 2 is another embodiment of the generator in a pipeline installation.

With reference to FIG. 2, a modified embodiment of the shock pulse generator will be seen in an installation particularly adapted for generating shock pulses in a gas pipeline 100. The shock pulse generator is connected to the gas line 100 by a flanged union 101 at the exist 20 of shock tube 18. This embodiment is essentially the same as that described in FIG. 1 with corresponding parts bearing the same numbers. Partition 44 has been modified slightly by eliminating the pressure chamber 62, the orifice supply channel 64, and the piston rod seal 66 shown in FIG. 1. It has been found in practice, that gas can be supplied to the cylinder chamber 102 between piston 50 and partition 44 by the leakage from the chamber 28 between piston rod 52 and partition 44.

Bleed screw 58 has been removed from fitting 56. The charging chamber 78 which supplies the pressurized fluid to the chamber 104 between the piston 50 and the cylinder head 46 is connected to the gas line 100 through duct 106 and the shock tube 18. There is no solenoid controlling the admission of charging fluid to the chamber 78. A spring 105 biases the piston toward cylinder head 46.

The shock wave generator is operated through a branched manifold assembly 108. The manifold 108 has separate branches 110, 112, and 114, respectively, joined to fittings 42, 56 and 74 of the generator. The manifold 108 has a discharge port 116 which is opened and closed by a servo-boosted discharge valve generally designated by 118. Branch 110 connects the low pressure chamber 28 to the discharge port 116 through fitting 42. Branch 112 connects chamber 54 and cylinder chamber 102 to the discharge port 116 through fitting 56 and an orifice 120. Branch 114 similarly connects cylinder chamber 104 to port 116 through fitting 74 and an orifice 122. Orifice 122 can be selected for use in series with orifice 76 of FIG. 1 or may be used in place of orifice 76. The orifices 120 and 122 are selected to control the rate at which pressure drops in the cylinder chambers 102 and 104 as described in greater detail below.

The discharge valve 118 includes a housing 124 and pressure operated poppet 126 which opens and closes the discharge port 116 of the branched manifold assembly 108. The housing 124 has an entrance 128 connected to the discharge port 116 and an exist 130. The poppet 126 closes the discharge valve 118 by moving against the valve seat 132. Connected with the poppet is piston 134. The gas pressure from the pipeline 100 is applied to the piston 134 through the duct 106, orifice 136 and channel 138 to hold the valve 118 normally closed. A duct 140 connects channel 138 with the valve exist 130 through a solenoid valve 142. When the solenoid valve 142 is opened and flow is established in duct 140, the pressure in channel 138 will drop below the pipeline pressure due to the orifice 136. The pressure in the exist 130 and the pressure in the manifold 108 operating on the differential area of the seat 132 and piston 134 will open the valve 118. The servo operation provided by the piston 134 and solenoid valve 142 produces a more rapid actuation of the poppet 126 than would a heavy duty solenoid connected directly to the poppet 126.

OPERATION

Pulse generation

Referring again to FIG. 1, the various modes of operation which generate a shock pulse will be described in detail.

*Pressure mode.*—In the pressure mode of operation, a high pressure gas source is connected to the fitting 42 to pressurize chamber 28. The exist 20 of the shock tube 18 is exposed to a gas at a pressure less than that of chamber 28. Experiments with this apparatus have established that the pressure differential between the chamber 28 and the exist 20 should be no less than 30 p.s.i. and a differential of at least 50 p.s.i. is preferred.

In the pressure mode of operation, the valve 30 is initially positioned adjacent to the partition 44. The valve 30 is rapidly accelerated to a high speed by piston rod 52. When the apertures 38 register with the slot formed between the end of shock tube 18 and plug 24, the pressurized gas in chamber 28 will surge into the annular passage leading to the inside of the shock tube 18. Since a finite period of time is required to open the valve, and since the gas in chamber 28 has inertia, the pressure in the annular passage does not rise instantaneously to the pressure of chamber 28. The pulse of gas moving through the apertures 38 into the passage will establish a pressure front having a pressure equal to that of the gas in the tube at the leading edge. The pressure front will then increase rapidly to a pressure which approaches that in chamber 28. The rise time of the pulse, that is the time interval that the pressure front requires to pass a given point, may be approximately 100 microseconds when the pulse is in the annular passageway. As this pressure front moves down through the shock tube 18 toward exist 20, the leading edge of the pulse will be reinforced by the faster moving rear portion of the pulse. Reference may be had to a text such as Compressible Fluid Flow by A. H. Shapiro for a more thorough description of this phenomenon. The result is that the pressure gradient of the pulse front will increase with a corresponding decrease in rise time. The pulse which leaves the shock tube will have a rise time less than 5 microseconds. For accuracy in measuring gas flow rates with pulses a sharp pulse having a short rise time is necessary.

It will be understood that the apertures 38 with a finite width may move completely across the slot formed between the shock tube 18 and plug 24 and consequently cut off the flow through the valve before the valve comes to rest. This will not adversely affect the leading edge of the shock pulse provided that a sufficient quantity of gas from the chamber 28 is admitted into the passage during the period that the valve is open. The more this quantity of gas is restricted, the smaller the quantity of gas available in the pulse for reinforcing the leading edge. At some upper limit, however, additional quantities of gas will not aid the pulse front because of energy dissipation within the gas.

If the valve 30 is immediately returned to its initial position adjacent to the partition 44, apertures 38 will register with the slot a second time during the return stroke. This second opening of the slot will not interfere with a shock pulse that has already been generated and left the shock tube. Only the leading edge of the first pulse is important in measuring flow rates.

*Reverse flow mode.*—In the reverse flow mode of operation, the motion of the valve is the same as that described above under the pressure mode. The essential difference in the reverse flow mode of operation is that the pressure differential across the valve is reversed from that of the pressure mode. The shock tube exit 20 is exposed to a high pressure source and the fitting 42 and chamber 28 are connected to a corresponding low pressure source. This reverse flow mode of operation is particularly suited to measuring gas flow in pipelines, because pipeline pressure, to which exit 20 is exposed, is generally sufficiently higher than atmospheric pressure, to which fitting 42 could be exposed, to establish the desired 50 p.s.i. pressure differential for pulse generation.

Although valve motion is essentially the same in both modes of operation, the method of forming the pulse is quite different. The valve takes an initial position adjacent to partition 44 and is accelerated rapidly toward the shock tube 18. As the apertures 38 move across the slot between the shock tube 18 and plug 24, reverse flow is established from the tube 18 into chamber 28. This flow, however, will only exist for a short period of time. As the apertures 38 continue to move across the slot at a high velocity, the gas flow will be suddenly cut off. The momentum of the gas moving through the shock tube will compress the gas in the annular passageway and a pulse will be generated which again moves down through the shock tube toward the exit 20. The gas in the shock tube adjacent to the plug 24 will be at a higher pressure than the gas at the leading edge of the pressure pulse and consequently the leading edge of the pulse will be reinforced as the gas at the rear of the pressure wave catches up with the leading edge.

It will be recognized that in the pressure mode of operation, the pulse is generated as the apertures 38 open the slot between the shock tube 18 and plug 24 and in the reverse flow mode of operation the pulse is generated as the apertures close this slot. A single instrument can operate in either mode as long as the velocity of the valve is high enough when the change in flow through the annular passageway is made. Experiments with this apparatus have indicated that an opening time or a closing time of 100 microseconds establishes a pressure pulse with a rise time less than 5 microseconds at the shock tube exit 20.

Actuator operation

Having described the two different modes of producing a pressure pulse with the valve, the apparatus for achieving the high velocity of the valve will be described next.

The actuator is composed basically of the piston 50 and cylinder 48. It can be operated with hydraulic fluid, but compressed gas is preferred. The pressure source for producing the shock pulse and the pressure source for operating the actuator can be the same. Initially, the piston 50 will be positioned adjacent to the cylinder head 46. The projection 90 will be in sliding engagement with the recess 92. Only the central piston pressure area within the recess 92 will be exposed to the pressure of the charging chamber 78. The same pressure source which supplies the charging chamber can also be connected to fitting 60. The fluid passing through the actuator from fitting 60 to bleed fitting 56 will establish a steady state pressure against the piston 50 to hold it against the cylinder head 46. When the solenoid 82 is opened, the pressure of charging chamber 78 will increase to a pressure higher than the steady state pressure established by orifice 64. When the pressure in charging channel 70 applies a force against the piston 50 slightly larger than the force applied by the pressure established by orifice 64, the piston will begin to move toward the partition 44. As the projection 90 moves out of engagement with recess 92, the entire surface 86 of the piston 50 will be exposed to the pressure of the charging chamber 78. The orifice 76 will prevent charging pressure from simultaneously bleeding through channel 72. Neglecting the small projected area of piston rod 52 in chamber 28, the pressures on each side of the piston, at this instant of time, will be inversely proportional to the ratio of the central piston pressure area of surface 86 and the total piston pressure area of surface 63. With a ratio of 10:1, a very high acceleration force will propel the piston 50 toward the partition 44. It will be noted that there are no piston seals or valve seals which would reduce the acceleration of the piston. Also the valve base 34 has large apertures to prevent the air between plug 24 and the base 34 from restricting motion of the valve. As a result, the piston will achieve a high velocity as it approaches the partition 44. Once the skirt section of the piston 50 passes over the vent ports 68, the pressure applied to the piston surface 63 will begin to increase and decelerate the piston. It is important, therefore, that the vent ports 68 be positioned in the cylinder 48 at a location close to the piston position at which the apertures 38 change the flow in the shock tube 18. This will insure that the buffing chamber formed between piston 50 and partition 44 will not adversely affect the high velocity of the piston necessary for pulse generation.

When the solenoid 82 has been closed, the pressure applied to piston surface 86 will slowly bleed through channel 72 and orifice 76. The pressure applied to piston surface 63 will then tend to bias the piston back toward its initial position adjacent to cylinder head 46.

The apparatus in FIG. 2 is specially adapted for a pipeline installation. Power is derived from the pressurized gas in the pipeline and the amount of gas discharged to the atmosphere during pulse generation is minimized.

With the solenoid valve 142 closed, the entire pressure of the pipeline 100 will be applied through duct 106 and orifice 136 to the piston 134 to close the discharge valve 118. With no seals between the moving parts of the generator 10, leakage past the valve 30 and the piston 50 from the pipeline will charge the chambers 28, 102, 104 and 78. With all the pulse generator chambers and the branched manifold assembly 108 at pipeline pressure, the spring 105 will bias the piston 50 toward the cylinder head 46. When the solenoid valve 142 is opened and flow through duct 140 is established, the pressure in channel 138 applied to the piston 134 will drop due to the orifice 136. The manifold pressure on the opposite side of the piston 134 will force the discharge valve 118 to open. Chamber 28 will drop to the discharge pressure in the manifold 108 and the chamber 104 and channel 72 will also bleed down through the orifice 122 in branch 114. The orifice 120 has been selected to bleed the chamber 102 at a slower rate than orifice 122 bleeds chamber 104.

As a result, chamber 104, which is very small when the piston is adjacent to cylinder head 46, will reach the discharge pressure before the large pressure differential between chamber 102 and chamber 78 is reached. As described above, when the equilibrium condition is slightly unbalanced, the piston 50 will be accelerated toward the partition 44. The spring 105 will apply a very slight restraining force; however, the spring is not strong enough to substantially reduce the piston velocity at the position where the valve changes the flow in the shock tube 18.

It is, of course, essential to the operation of the generator in the FIG. 2 configuration that the manifold assembly 108 and the discharge valve 118 permit a free flow of the gas discharged from the generator chambers. For this reason, the number of bends should be minimized and the size of the branches and valve should be selected to accommodate the discharging flow without producing large back pressures which would interfere with the chamber discharging sequence established primarily by orifices 120 and 122.

When the solenoid valve 142 is closed, the discharge valve 118 will close. Leakage past the valve 30, piston 50 and projection 90 will again bring the system up to pipeline pressure and the spring 105 will return the piston 50 to the initial position for the next pulse.

It is significant that the discharge valve 118 needs to be opened only during the period of time necessary to actuate the valve. With proper sizing of the orifices 136, 122 and 120, this time may be reduced to fifteen milliseconds and the quantity of gas which escapes during this period will be very small.

A slightly modified configuration of the system in FIG. 2 permits the piston 50 to be returned to its original position by the pipeline pressure rather than the spring 105. This modification requires that the supply duct 106 be disconnected from the charging chamber 78 as shown in FIG. 3 and that a check valve 150 be installed in the branch 114 of the manifold 108 to prevent flow into the cylinder chamber 104 from branch 114. With such construction, the charging chamber 78 receives the energizing gas by means of leakage past valve 30, through the manifold 108 and partition 44, and around piston 50 and projection 90. Since the check valve 150 prevents gas from entering chamber 104 through the branch 114, the gas will leak into chamber 102 first and force piston 50 against cylinder head 46 before chamber 78 is recharged. The advantage gained by this construction is that the spring 105 can be eliminated and therefore there will be no restraining force, however slight, to reduce the piston velocity at the position where the valve 30 changes the flow in the shock tube 18.

The leakage rate between chambers in this pipeline installation should be sufficient to charge the chambers over the span of a second but cannot be so large that it interferes with the operation of the generator during the fifteen-millisecond period that the discharge valve 118 is opened.

Although the apparatus has been described for generating a pulse in a gas, the device may be used equally well for producing a pulse in a liquid. The invention is not limited to the specific embodiments herein illustrated and described but may be used in other ways without departure from its spirit as defined by the following claims.

I claim:

1. An apparatus for producing a pressure pulse in a gas comprising:
 (a) a housing having a chamber for confining a gas under a first pressure;
 (b) a conduit having a first end for emitting a pressure pulse into a gas under a second pressure, said conduit having a second end opening into the chamber in the housing;
 (c) a shaped plug mounted in the chamber adjacent to the second end of the conduit, the plug and the second end of the conduit being spaced to form an annular passage leading from the chamber to the inside of the conduit;
 (d) a valve enveloping the second end of the conduit and the plug, the valve having an open position permitting the differential of the first and second pressures to cause a flow of gas through the annular passage and a closed position for preventing the gas flow through the annular passage; and
 (e) a fluid actuator having a cylinder and movable piston, the piston being movable from a first end of the cylinder to a second end of the cylinder, said piston and cylinder cooperating to form two effective piston pressure areas on one side of the piston, one area being inoperative at said first end of the cylinder, said piston being connected to the valve to actuate the valve between said open position and said closed position when the piston is near the second end of the cylinder.

2. A shock wave source comprising:
 (a) a housing defining a chamber for a fluid under a first pressure;
 (b) a conduit having a first end within the chamber and a second end exposed to a fluid under a second pressure external to the housing, said first end of the conduit having a flared inside wall;
 (c) a tapered plug projecting into the first end of the conduit in spaced relation to the flared inside wall, the plug and the flared inside wall of the conduit forming an annular channel leading into the conduit from a peripheral slot between the first end and the plug;
 (d) a slide valve having a skirt section enveloping the plug and the first end of the conduit, the skirt section having an aperture operatively associated with the slot formed by the first end and plug, the valve having a closed position in which the skirt section covers the slot and an open position in which the aperture registers with the slot to open the channel between the chamber and conduit; and
 (e) means for moving the slide valve between the opened and closed positions to control the flow of fluid between the conduit and the chamber.

3. A shock pulse source comprising:
 (a) a housing having a chamber for receiving a gas under a first pressure;
 (b) a shock pulse generating tube having one open end for emitting a shock pulse into a gas at a second pressure and a closed end defining an aperture for communicating the inside of the tube with the chamber;
 (c) a valve interposed between the closed end of the tube and the chamber for controlling flow of gas in response to the first and second pressures;
 (d) a fluid actuator having a piston and cylinder assembly;
  (1) the piston being connected to the valve for controlling the gas flow;
  (2) the cylinder having a first end member cooperating with the piston to form two effective pressure areas on the surface of the piston confronting said first end member, one of the effective pressure areas being operative along a limited portion of the piston stroke, the first end member having a charging channel for applying fluid against the piston and a discharging channel for removing the fluid;
  (3) the cylinder having a second end member having a fluid supply port,
  (4) the cylindrical wall of the cylinder having a fluid bleed port adjacent to the second end member for establishing a continuous flow of pressurized fluid between the supply port and the bleed port when the piston is not positioned between the ports; and (e) a control means for introducing a charge of fluid under a third pressure through the charging channel to the piston.

4. A shock pulse source comprising:
(a) a housing having a chamber for receiving a gas under a first pressure;
(b) a shock pulse generating tube having one open end for emitting a shock pulse into a gas at a second pressure and a closed end defining an aperture for communicating the inside of the tube with the chamber;
(c) a valve interposed between the closed end of the tube and the chamber for controlling flow of gas in response to the first and second pressures;
(d) a fluid actuator including a piston and cylinder;
 (1) the piston being connected to the valve for controlling the valve;
 (2) the cylinder having a first end member and a second end member, the piston being movable within the cylinder between the end members;
 (3) the first end member and the piston having confronting contoured surfaces, the surfaces being mated to move in intermeshing engagement during the segment of the piston displacement adjacent to the first end member, a portion of the confronting surfaces of the first end member and piston being shaped to move in sliding contact over said segment of the piston displacement;
 (4) the first end member having a first port leading from a charging channel in the first end member into the cylinder and a second port leading from the cylinder to an orificed bleed channel in the first end member, one of the ports being located on the confronting surface of the end member at a position bounded by a portion of the surface which moves in sliding contact with the piston;
(e) a means for introducing a charge of fluid under a third pressure through the charging channel against the piston to drive the piston toward the second end member; and
(f) a means for returning the piston toward the first end member as the charge of fluid is bled through the orificed bleed channel.

5. An apparatus adapted to generate a shock pulse in a pressurized gas comprising:
(a) a housing having a low pressure chamber and a charging chamber;
(b) a shock tube having a first end defining a shock wave exit for emitting a shock wave into the pressurized gas, and a second end communicating with the low pressure chamber;
(c) a valve interposed between the second end of the shock tube and the low pressure chamber for controlling gas flow from the shock tube into the low pressure chamber;
(d) an actuator having a piston and cylinder assembly;
 (1) the cylinder having first and second end members;
 (2) the piston being movable within the cylinder between the end members and connected to the valve to interrupt the gas flow from the shock tube into the low pressure chamber when the piston is positioned near the second end member;
 (3) the piston and the cylinder forming a first cylinder chamber between the piston and the first end member, and a second cylinder chamber between the piston and the second end member;
 (4) said first end member having a charging channel connecting the charging chamber in the housing with the first cylinder chamber, the piston and the first end member cooperating to expose a limited area of the piston surface facing the first end member to the pressure of the gas in the charging chamber when the piston is adjacent to the first end member;
(e) a branched manifold assembly connecting the low pressure chamber to the first cylinder chamber through a first orifice and connecting the low pressure chamber to the second cylinder chamber through a second orifice, the first orifice being selected to bleed the first cylinder chamber more rapidly than the second orifice bleeds the second cylinder chamber when the first and second cylinder chambers have the same initial pressure and the piston is positioned adjacent to the first end member, the manifold assembly having a discharge port for bleeding the low pressure chamber and the first and second cylinder chambers;
(f) means for opening and closing the discharge port of the manifold assembly;
(g) means for pressurizing the charging chamber, the low pressure chamber and the first and second cylinder chambers with the pressurized gas when the discharge port is closed; and
(h) means for biasing the piston toward the first end member when the discharge port is closed.

6. An apparatus adapted to generate a shock pulse in a pressurized gas comprising:
(a) a housing having a low pressure chamber and a charging chamber;
(b) a shock tube having a first end defining a shock wave exit for emitting a shock wave into the pressurized gas, and a second end communicating with the low pressure chamber;
(c) a valve interposed between the second end of the shock tube and the low pressure chamber for controlling gas flow from the shock tube into the low pressure chamber, the valve being formed to permit a prescribed leakage rate between the shock tube and low pressure chamber when the valve is closed;
(d) an actuator having a piston and cylinder assembly;
 (1) the cylinder having first and second end members;
 (2) the piston being movable within the cylinder between the end members and connected to the valve to interrupt the gas flow from the shock tube into the low pressure chamber when the piston is positioned near the second end member;
 (3) the piston and the cylinder forming a first cylinder chamber between the piston and the first end member, and a second cylinder chamber between the piston and the second end member;
 (4) the cylinder having a first bleed channel leading from the first cylinder chamber, the first bleed channel having a first orifice therein;
 (5) the cylinder having a second bleed channel leading from the second cylinder chamber, the second bleed channel having a second orifice therein, the first orifice being selected to bleed the first cylinder chamber more rapidly than the second orifice bleeds the second cylinder chamber when the first and second cylinder chambers have the same initial pressure and the piston is positioned adjacent to the first end member;
 (6) said first end member having a charging channel connecting the charging chamber in the housing with the first cylinder chamber, the piston and the first end member cooperating to expose a limited area of the piston surface facing the first end member to the pressure of the gas in the charging chamber when the piston is adjacent to the first end member;
 (7) the piston and cylinder being formed to permit prescribed leakages between the first and second cylinder chambers and the charging chamber;

13

(e) a branched manifold assembly connecting the low pressure chamber with the first and second cylinder chambers;
  (1) said manifold assembly being connected to the first cylinder chamber through the first bleed channel and a check valve, said check valve being oriented to prevent flow from the manifold assembly into the first cylinder chamber;
  (2) said manifold assembly being connected to the second cylinder chamber through the second bleed channel;
  (3) the manifold assembly having a discharge port for bleeding the low pressure chamber and the first and second cylinder chambers; and
(f) means for opening and closing the discharge port of the manifold assembly.

7. A pressure pulse producing apparatus comprising:
(a) a tube having a first open end defining a pressure pulse exit exposed to a fluid medium at a first pressure and a second end defining an annular fluid entrance connecting the interior of the tube with a fluid medium at a second pressure external to the second end of the tube;
(b) a valve interposed between the second end of the tube and the fluid medium at the second pressure and operatively associated with said entrance, said valve having a first position permitting flow between the fluid mediums in response to a difference of the first and second pressures, and a second position permitting substantially no flow between the fluid mediums;
(c) a fluid actuator including a piston within a cylinder, said piston being displaceable between a first position and a second position within the cylinder, said piston and cylinder cooperating to form two effective piston pressure areas on one side of the piston, one area being operative at the first position of the piston and the other area being larger and operative along a portion of the piston displacement adjacent to the second position of the piston, said piston being operatively connected to said valve to open and close said valve within the portion of the piston displacement in which said other area is operative; and further that
(d) the piston has a third position between the first and second positions of the piston and within the portion of the piston displacement in which said other area is operative, at which third position the operative connection of the piston to the valve initiates a change in the fluid flow conditions; and
(e) the cylinder defines a vent port located near the third position of the piston, the piston and cylinder forming a buffing chamber between the vent port and the end of the cylinder contiguous to the second position of the piston.

8. Apparatus for producing a pressure pulse in a gas comprising:
(a) chamber means for confining a gas at a first pressure;
(b) conduit means having a first end for emitting a pressure pulse into a gas at a second pressure, said conduit means having a second end opening into the chamber means;
(c) a tapered plug spaced from and having at least one portion projecting within the second end of the conduit means to form an annular passage between the chamber means and the inside of the conduit means;
(d) valve means operatively associated with the plug and the second end of the conduit, the valve means having an open position permitting the differential of the first and second pressures to cause a flow of gas through the annular passage and a closed position for preventing the flow of gas through the annular passage; and

14

(e) means connected to the valve means for rapidly actuating the valve means between the open and closed positions to suddenly change the flow of fluid in the passage between the conduit means and the chamber means.

9. Apparatus for producing a shock wave comprising:
(a) a housing defining a chamber for fluid under a first pressure;
(b) a conduit having a first end within the chamber and a second end exposed to a fluid under a second pressure external to the housing, said first end of the conduit having a flared inside wall;
(c) a tapered plug projecting into the first end of the conduit in spaced relation to the flared inside fall, the plug and the flared inside wall of the conduit forming an annular channel leading into the conduit from a peripheral slot between the first end and the plug;
(d) a slide valve operatively associated with the peripheral slot, the valve having a first position for permitting fluid to be transferred through the slot and the channel and a second position in which fluid flow through the slot and channel is blocked;
(e) an actuator including a piston member within a cylinder having first and second end members, the piston member being displaceable between the first end member and the second end member, the piston member and the first end member having confronting, contoured surfaces, the surfaces having mating contours and portions which move in sliding contact within one segment of the piston member displacement adjacent the first end member, which portions separate the confronting surface of the piston member into at least two effective piston pressure areas, the piston member being connected to the valve to actuate the valve between the first and second positions within another segment of the piston member displacement adjacent the second end member.

10. Apparatus according to claim 9 wherein the confronting contoured surfaces of the piston member and first end member form a recess on the one member and a projection on the other member, the recess and the projection being mated to move in overlapping relationship along the segment of the piston displacement adjacent to the first end member, the overlapping surfaces of the recess and projection being in sliding contact.

11. Apparatus according to claim 9 wherein the contoured surface of the first end member has a first aperture connected with a first channel for applying pressurized fluid to the piston members and a second aperture leading to an orificed second channel for bleeding the pressurized fluid from the cylinder independently of the first channel, one of said apertures being located on the contoured surface at a position which is bounded by a portion of the surface which moves in sliding contact with the piston member.

References Cited

UNITED STATES PATENTS

| 2,443,312 | 6/1948 | Geiger et al. | 91—392 X |
| 3,185,043 | 5/1965 | Dunham | 91—392 X |
| 3,212,527 | 10/1965 | Hall et al. | 251—31 X |
| 3,347,135 | 10/1967 | Ahlbeck et al. | 91—392 X |
| 3,363,513 | 1/1968 | Ottestad | 91—392 X |
| 3,379,273 | 4/1968 | Chelminski | 340—7 X |

FOREIGN PATENTS

| 4,838 | 1878 | Great Britain. |

ARNOLD ROSENTHAL, Primary Examiner

U.S. Cl. X.R.

91—394; 137—625.38; 181—0.5; 251—63.5